United States Patent [19]

Schemel

[11] Patent Number: 4,637,144

[45] Date of Patent: Jan. 20, 1987

[54] APPARATUS FOR MONITORING THE DIAMETERS OF CRANKPINS DURING TREATMENT IN GRINDING MACHINES

[75] Inventor: Roland Schemel, Stuttgart, Fed. Rep. of Germany

[73] Assignee: Schaudt Maschinenbau GmbH, Stuttgart, Fed. Rep. of Germany

[21] Appl. No.: 734,905

[22] Filed: May 16, 1985

[30] Foreign Application Priority Data

Jul. 3, 1984 [DE] Fed. Rep. of Germany ....... 3424405

[51] Int. Cl.$^4$ ................................................. G01B 5/20
[52] U.S. Cl. .................................... 33/550; 33/178 E
[58] Field of Search ..................... 33/178 E, 550, 555, 33/549, 180 B, 504

[56] References Cited

U.S. PATENT DOCUMENTS 3,274,693 9/1966 Witzke .............................. 33/550 X
3,321,869 5/1967 Parrella et al. ............... 33/178 E X
3,648,377 3/1972 Witzke ........................... 33/178 E X

FOREIGN PATENT DOCUMENTS 2158277 6/1972 Fed. Rep. of Germany .... 33/178 E

Primary Examiner—William D. Martin, Jr.
Attorney, Agent, or Firm—Peter K. Kontler

[57] ABSTRACT

The periphery of a selected crankpin is ground while the crankshaft rotates about an axis which is parallel to the axis of the crankpin. The decreasing diameter of the crankpin is monitored by one or more sensors which are connected with a detector serving to transmit signals to the controls of the grinding machine. Retention of the sensors in continuous contact with the circulating crankpin is ensured by an elongated guide which supports the sensors and the detector and is mounted on the piston rod of a cylinder. The latter is pivotable in a holder which is reciprocably or fixedly secured to the table or to the understructure of the frame of the grinding machine. A coil spring in the cylinder biases the piston and the piston rod in a direction to maintain the forward end of the guide in continuous contact with the periphery of the circulating crankpin.

27 Claims, 7 Drawing Figures

APPARATUS FOR MONITORING THE DIAMETERS OF CRANKPINS DURING TREATMENT IN GRINDING MACHINES

BACKGROUND OF THE INVENTION

The present invention relates to improvements in apparatus for measuring the diameters of moving round objects, and more particularly to improvements in apparatus for monitoring the diameters of objects whose axes orbit about a fixed axis. Typical examples of such objects are the crankpins of a crankshaft which is installed in a machine tool (e.g., in a grinding or milling machine) for rotation about an axis which is the common axis of its two end portions and is parallel to the axes of the crankpins.

Monitoring apparatus of the above outlined character normally comprise a detector (also called measuring head) which is provided with one or more finger- or prong-like sensors in contact with the periphery of the circulating workpiece. Such monitoring apparatus operate quite satisfactorily as long as the axis of rotation of the object (e.g., a workpiece) coincides with the axis of that part which is being treated, i.e., of the part whose diameter is in the process of diminishing as a result of removal of material therefrom by one or more grinding wheels, milling cutters or other suitable tools. However, the situation becomes much more complicated when a selected portion of a workpiece (such as a selected crankpin of a crankshaft with two or more crankpins) must circulate about a fixed axis which does not coincide with the axis of the selected portion of the workpiece. Under such circumstances, conventional monitoring apparatus cannot ensure continuous contact between the sensor or sensors and the periphery of the selected portion of the workpiece so that the monitoring operation is unreliable and the removal of material from the selected portion of the workpiece is likely to be terminated prematurely or too late.

OBJECTS AND SUMMARY OF THE INVENTION

An object of the invention is to provide a novel and improved apparatus which can reliably monitor selected (normally cylindrical or barrel-shaped) portions of workpieces while the selected portions orbit about an axis which does not coincide with their own axes.

Another object of the invention is to provide the above outlined apparatus with novel and improved means for ensuring the establishment of uninterrupted contact between the selected circulating portion of a workpiece or another object and one or more sensors.

A further object of the invention is to provide novel and improved means for carrying the sensor or sensors while the sensor or sensors are in the process of tracking the periphery of a circulating object, such as the crankpin of a crankshaft in a grinding or milling machine.

An additional object of the invention is to provide the apparatus with novel and improved means for ensuring the movability of one or more sensors in a number of different directions for the purpose of maintaining the sensor or sensors in contact with an object which is caused to circulate about an axis extending in parallelism with the axis of the object.

Still another object of the invention is to provide an apparatus whose monitoring operation is much more reliable than that of heretofore known apparatus and which can be installed in existing grinding, milling and/or like machines for continuous determination of the diminishing diameters of cylindrical or similar objects while the objects circulate about axes extending in parallelism with their own axes.

A further object of the invention is to provide a novel and improved method of monitoring the diameters of objects which circulate in the aforedescribed manner.

An additional object of the invention is to provide an apparatus which can immediately shift from monitoring of the diameters of large-diameter objects to monitoring of the diameters of small-diameter objects or vice versa, and which is designed with a view to allow for rapid and convenient exchange of objects.

The apparatus of the present invention is designed to monitor the diameters of round objects, particularly to monitor the diameters of substantially or exactly cylindrical workpieces during their treatment in machine tools. The improved apparatus can be used with advantage in a grinding or milling machine which is designed to reduce the diameters of crankpins of crankshafts by means of one or more grinding wheels, milling cutters or analogous material removing tools. In accordance with the invention, the apparatus comprises supporting means (e.g., the headstock and the tailstock of a grinding machine) defining a predetermined axis and serving to mount objects in such positions that the axis of the object which is mounted in the supporting means is parallel to the predetermined axis, i.e., that the object is free to circulate or orbit about the predetermined axis along a predetermined path. Otherwise stated, the axis of the object which is to be treated is remote from and is preferably exactly parallel to the predetermined axis which is defined by the supporting means. The apparatus further comprises a guide a portion of which is to contact the peripheral surface of the orbiting object, at least one sensor (e.g, an elastic finger or a pivotable finger) provided on the guide and serving to track the periphery of an object which circulates along the predetermined path while the aforementioned portion of the guide contacts the periphery of the circulating object, detector means provided on the guide and serving to monitor the position of the sensor in order to thereby indirectly monitor the diameter of the circulating object, and carrier means for the guide. The carrier means is constructed, mounted and assembled in such a way that the guide is movable relative thereto substantially radially of the predetermined path (so that the aforementioned portion of the guide can remain in contact with the periphery of the orbiting or circulating object while the diameter of the object is on the decrease). In addition, the carrier means defines for the guide a pivot axis which is at least substantially parallel to the predetermined axis (this is necessary for the purpose of ensuring that the guide and the sensor or sensors can remain in contact with the periphery of the circulating object while the diameter of the object is in the process of decreasing due to removal of material therefrom by one or more grinding wheels, milling cutters or analogous material removing tools).

The apparatus preferably further comprises means for permanently biasing the aforementioned portion of the guide against the periphery of the object which circulates along the predetermined path.

The carrier means can comprise a holder, a cylinder which is mounted in or on the holder for movement about the aforementioned pivot axis, a piston which is reciprocably mounted in the cylinder, and a piston rod which connects the piston with the guide. The biasing means of such apparatus can comprise resilient means (e.g., a single prestressed coil spring, two or more prestressed coil springs, a package of prestressed dished springs or the like) which is installed in the cylinder and bears against the piston to urge the latter in a direction such that the piston rod maintains the aforementioned portion of the guide in contact with the periphery of the object which circulates along the predetermined path.

The apparatus is preferably further equipped with means for moving the guide away from contact with the periphery of the object which circulates or is mounted for circulation along the predetermined path. This is particularly desirable for convenient removal of a finished object and for insertion of a fresh (untreated) object. Such moving means can comprise a source of pressurized hydraulic or pneumatic fluid and means for admitting pressurized fluid into the cylinder at one side of the piston so that the admitted fluid causes the piston to retract the piston rod and hence the guide in a direction away from the path of the object which is held by the supporting means. Thus, the cylinder can be a double-acting cylinder which acts in one direction under the bias of the resilient means and which acts in the other direction under the pressure of a hydraulic or pneumatic fluid. The pressurized fluid can move the piston against the opposition of the resilient biasing means, and the latter is preferably designed to immediately return the aforementioned portion of the guide into contact with the object in the supporting means or into contact with a freshly inserted object as soon as the pressure of the fluid in the cylinder drops below a preselected threshold value.

The aforementioned portion of the guide can be provided with a substantially V-shaped object-contacting surface, i.e., such surface can be brought into twin linear contact with the cylindrical peripheral surface of a circulating object. Alternatively, the object can be contacted by a concave surface of the guide so that the latter is in a single-line contact with the cylindrical peripheral surface of a circulating object. Still further, the front portion of the guide can be provided with one or more rotary object-contacting followers in the form of wheels, rolls or spheres each of which can be in a mere point contact or in a single-line contact with the peripheral surface of the object. Each of the followers on the guide is preferably rotatable about an axis which is at least substantially parallel to the predetermined axis (of course, a spherical follower can rotate about any one of an infinite number of axes which pass through its center).

It is also possible to utilize a guide at least a portion of which is adjustable so that the guide can be moved into adequate contact with a larger-diameter, medium-diameter or small-diameter cylindrical or substantially cylindrical surface. For example, that portion of the guide which is adjacent to the path of the object in the supporting means or the entire guide can be made of two sections at least one of which is adjustable relative to the other section so that each section can be maintained in contact with objects having slightly or widely different diameters. Each of the two sections can have an object-contacting surface and such surfaces can be inclined relative to each other so as to form a substantially V-shaped composite surface. At least one of the sections can be formed with an elongated opening (particularly an elongated closed slot) which extends transversely of the predetermined axis, and such guide further comprises fastener means (e.g., a bolt and nut assembly) for releasably and (if desired) separably securing the movable section in a selected position with reference to the other section. A portion of the fastener means extends through the aforementioned opening. Each of the sections can be provided with a plurality of (e.g., with two) elongated openings, and each opening of one section preferably overlaps a portion of an opening in the other section. Such guide is provided with discrete fastener means for each pair of partially or fully overlapping openings. At least one of the two sections can be provided with a suitably graduated scale to facilitate the adjustment (i.e., the selection of position) of the movable section with reference to the other section.

The carrier means can be mounted in the frame of a grinding machine, a milling machine or another suitable machine tool. For example, the aforementioned holder of the carrier means can be affixed to the frame of the machine tool, e.g., to the table of a grinding machine, and the guide is reciprocable as well as pivotable with reference to such holder. If the carrier means further comprises the aforementioned cylinder, piston and piston rod, the cylinder is preferably mounted in the holder in such a way that a portion thereof constitutes a counterweight for the guide, the detector means and the sensor or sensors. In other words, the location of the pivot axis is selected with a view to ensure that the mass of the part or parts at one side of the pivot axis at least approximates the mass of the part or parts at the other side of the pivot axis. This reduces or minimizes the inertia of the cylinder and of the parts which are carried thereby, i.e., a minimal force suffices to pivot the cylinder with reference to the holder of the carrier means. While the state of equilibrium changes during removal of material from the circulating object, the extent of such change is rather small so that the force which is required to pivot the cylinder relative to the holder does not vary within a wide range. The pivot axis for the cylinder is or can be substantially horizontal.

The apparatus can further comprise means (such as a detent pin, a locking bolt or the like) for releasably fixing the guide in a selected position with reference to the pivot axis and/or against movement substantially radially of the object which is installed in the supporting means. This facilitates removal of a finished object and the insertion of a fresh object. If the fixing means comprises a pin or a similar part, the latter is preferably movable, axially or otherwise, with reference to the carrier means, between a first position in which the guide is free to turn about the pivot axis and a second position in which the guide is held in a predetermined position, e.g., at a certain angle to the horizontal, to allow for unimpeded exchange of objects. The holder of the carrier means can be fixedly secured to the aforementioned table of a machine tool, it can be fixedly or adjustably secured to the understructure of the frame of a grinding machine or the like, or the entire carrier means can be mounted on a carriage for reciprocatory movement with reference to the frame of a grinding machine or the like so as to enhance the versatility of the improved apparatus.

The sensor or sensors of the apparatus can comprise cutting edge-like or pointed object-contacting portions which are movable with reference to the guide so as to remain in contact with the periphery of an object which orbits along the predetermined path and whose diameter is in the process of decreasing as a result of engagement with a material removing tool (e.g., a grinding wheel).

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
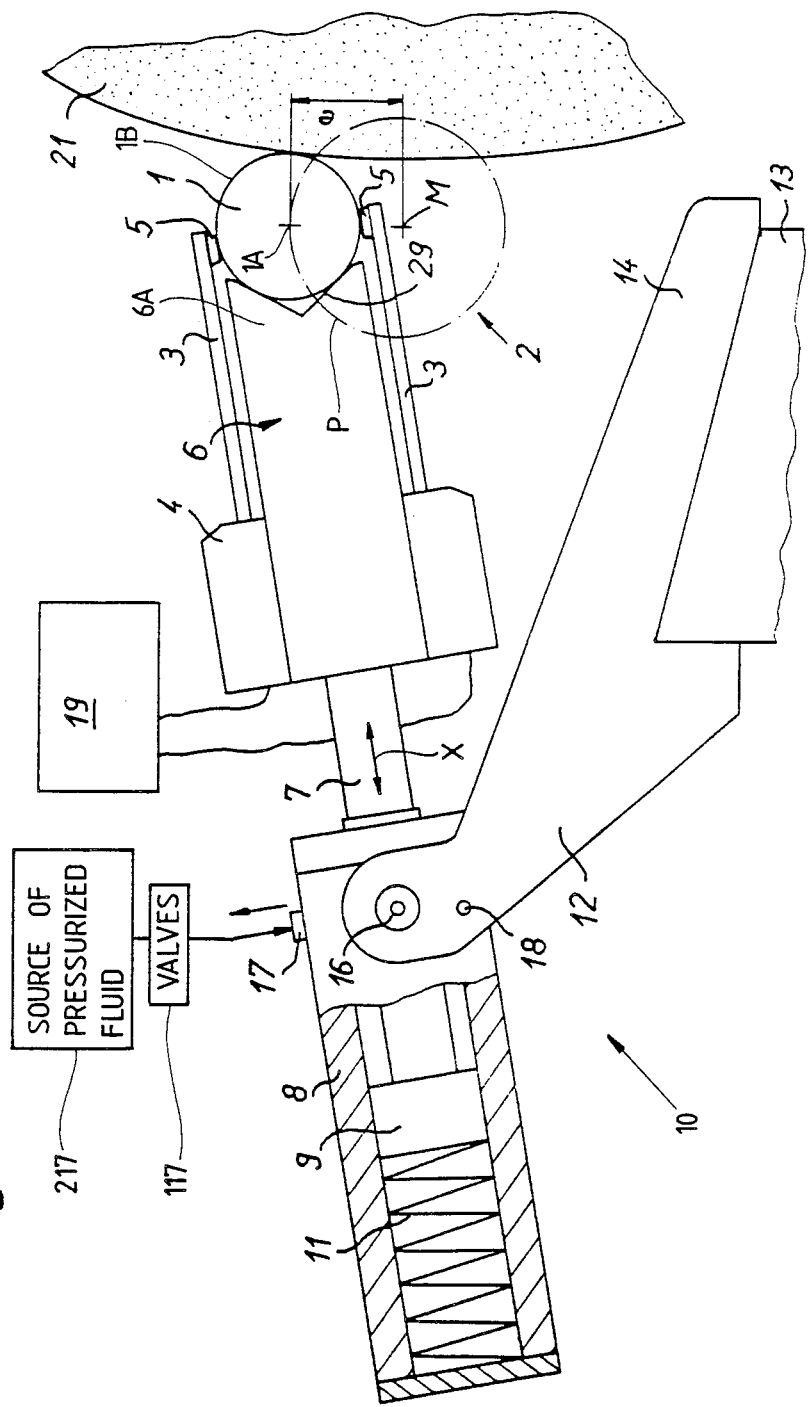
FIG. 1 is a schematic partly elevational and partly sectional view of a monitoring apparatus which embodies one form of the invention and whose carrier means for the guide is fixedly secured to the table of a grinding machine, the guide being shown in actual contact with the peripheral surface of the crankpin of a crankshaft.

FIG. 1 shows a portion of a grinding machine which includes a table 13 and a grinding wheel 21. The manner in which the grinding wheel 21 is mounted in the frame of the grinding machine forms no part of the invention. Reference may be had, for example, to the commonly owned copending patent application Ser. No. 690,129 filed Jan. 10, 1985. The working surface of the grinding wheel 21 is in the process of treating the peripheral surface 1B of a crankpin 1 which forms part of a crankshaft 2 (see particularly FIG. 3). The crankshaft 2 is mounted for rotation in the frame of the grinding machine so that its two end portions 2A and and 2B (see FIG. 3) turn about a predetermined axis M which is parallel to and spaced apart from the axis 1A of the crankpin 1. Thus, when the crankshaft 2 rotates about the axis M, the axis 1A of the crankpin 1 circulates or orbits about the axis M along a predetermined circular path P. The reference character e denotes the eccentricity of the crankpin 1, i.e., the shortest distance between the axes M and 1A.

The improved monitoring apparatus comprises two sensors 3 in the form of elongated arms or fingers with edges 5 which should be maintained in continuous contact with the peripheral surface 1B of the crankpin 1 while the axis 1A orbits or circulates along the path P. The sensors 3 are disposed diametrically opposite each other with reference to the axis 1A and transmit signals to a detector or measuring head 4; such signals are indicative of the momentary diameter of the crankpin 1, and the output of the detector 4 is connected with the input of a control circuit 19 which regulates the operation of the grinding machine. For example, the control circuit 19 can be designed to arrest the grinding wheel 21 and/or to move the grinding wheel away from the perpheral surface 1B of the crankpin 1 when the latter's diameter is reduced to a preselected value. The detector 4 can be a commercially available measuring head of the type manufactured and sold by the firm Marposs or Movomatik, both German Federal Republic.

In accordance with a feature of the invention, the monitoring apparatus further comprises an elongated rigid guide 6 which carries the detector 4 and its sensors 3 and has a front portion 6A provided with a substantially V-shaped object-contacting surface 29 which is in continuous contact with the peripheral surface 1B during removal of material from the crankpin 1. In order to ensure that the edges 5 of the sensors 3 can remain in uninterrupted contact with the peripheral surface 1B during removal of material from the crankpin 1 (by the grinding wheel 21), the guide 6 is mounted on a novel and improved carrier 10 which includes a holder 14 fixedly secured to the table 13 of the machine frame, a pin or shaft 16 which defines a pivot axis extending in parallelism with the axes M and 1A, an elongated cylinder 8 which is turnable about the axis of the pin 16 between two arms 12 of the holder 14, a piston 9 which is reciprocable in the cylinder 8, a piston rod 7 which rigidly connects the piston 9 with the guide 6, and a prestressed resilient element in the form of a coil spring 11 which is installed in the cylinder 8 and permanently biases the parts 6, 7, 9 (and hence the detector 4 and its sensors 3) in a direction substantially radially of the endless path P. It will be seen that the guide 6 is reciprocable with reference to the cylinder 8 in the directions indicated by a double-headed arrow X, and that the cylinder 8 and the guide 6 are pivotable as a unit about the axis which is defined by the pin 16.

The position of the pivot pin 16 with reference to the cylinder 8 is selected in such a way that the mass of the major part of the cylinder plus the mass of the piston 9 and coil spring 11 balances the mass of the guide 6, detector 4 and sensors 3, i.e., that the cylinder 8 and its piston 9 (together with the coil spring 11 and a portion of the piston rod 7) constitute a counterweight for the remaining part of the piston rod 7, the detector 4, the guide 6 and the sensors 3 in order to reduce the inertia of those parts which must track the peripheral surface 1B of the crankpin 1.

In order to allow for rapid retraction of the guide 6 from the path P when the treatment of the crankpin 1 is completed (or for inspection of the crankpin prior to completion of the treatment), the improved monitoring apparatus further comprises means for moving the piston rod 7 and the guide 6 (with detector 4 and sensors 3) against the opposition of the coil spring 11. In the embodiment of FIG. 1, such moving means comprises a source 217 of pressurized hydraulic or pneumatic fluid, a nipple 17 at the forward end of the cylinder 8, and a system of valves 117 which regulate the admission of pressurized fluid into and evacuation of fluid from the cylinder chamber in front of the piston 9. For example, the source 217 can contain a supply of compressed air or a supply of pressurized oil.

Still further, the apparatus comprises means for arresting the cylinder 8 (and hence the guide 6 with the detector 4 and sensors 3) in at least one predetermined angular position with reference to the arms 12 constituting the bifurcated portion of the holder 14. The illustrated arresting means comprises a pin 18 which is mounted in one of the arms 12 and is movable between a first (retracted) position in which the cylinder 8 is free to pivot relative to the holder 14 and a second (extended) position in which the cylinder 8 is held in a selected angular position, preferably in an angular position in which the material removing station is readily accessible for replacement of the crankshaft 2 with a fresh shaft or for shifting of the crankshaft 2 so as to move another crankpin 1 to an optimum position for removal of material therefrom. At such time, the valves 117 admit pressurized fluid into the respective chamber of the cylinder 8 so that the guide 6 holds the detector 4 and the sensors 3 in their retracted positions. The cylinder 8 can be formed with two or more sockets for the adjacent end portion of the pin 18 so that it can be releasably locked in any one of several angular positions at a selected angle to the horizontal and to the axis M of the crankshaft 2. Furthermore, the pin 18 can be replaced with a locking bolt or with any other suitable arresting means for the cylinder 8 without departing from the spirit of the invention.

When the grinding wheel 21 rotates to remove material from the peripheral surface 1B of the circulating crankpin 1, the edges 5 of the sensors 3 are in continuous contact with the peripheral surface 1B and thus enable the detector 4 to accurately and continuously monitor the diameter of the crankpin at the material removing station. The detector 4 transmits a signal when the diameter of the crankpin 1 is reduced to a desired value whereby the control circuit 19 arrests the grinding wheel 21, retracts the spindle for the grinding wheel from the crankshaft 2 and/or actuates the valves 117 to retract the surface 29 of the front portion 6A of the guide 6 from the peripheral surface 1B of the crankpin 1. The control circuit 19 may be of the type known as S3G, manufactured and sold by the Firm Siemens, German Federal Republic.

The position of the arresting pin 18 relative to the cylinder 8 and the position or positions of the socket or sockets which are provided in the cylinder 8 for the adjacent end portion of the pin 18 are preferably selected with a view to ensure that the crankpin 1 of a freshly installed crankshaft 2 can be maintained in a predetermined angular position with reference to the axis M. Such predetermined angular position of the freshly inserted crankpin 1 is desirable in order to ensure that the peripheral surface 1B of the crankpin is properly engaged by the surface 29 of the guide 6 when the arresting pin 18 is moved to its retracted position and the coil spring 11 is again free to move the piston 9 forwardly, i.e., toward the path P of circular movement of the freshly inserted crankpin.

Figure 2:
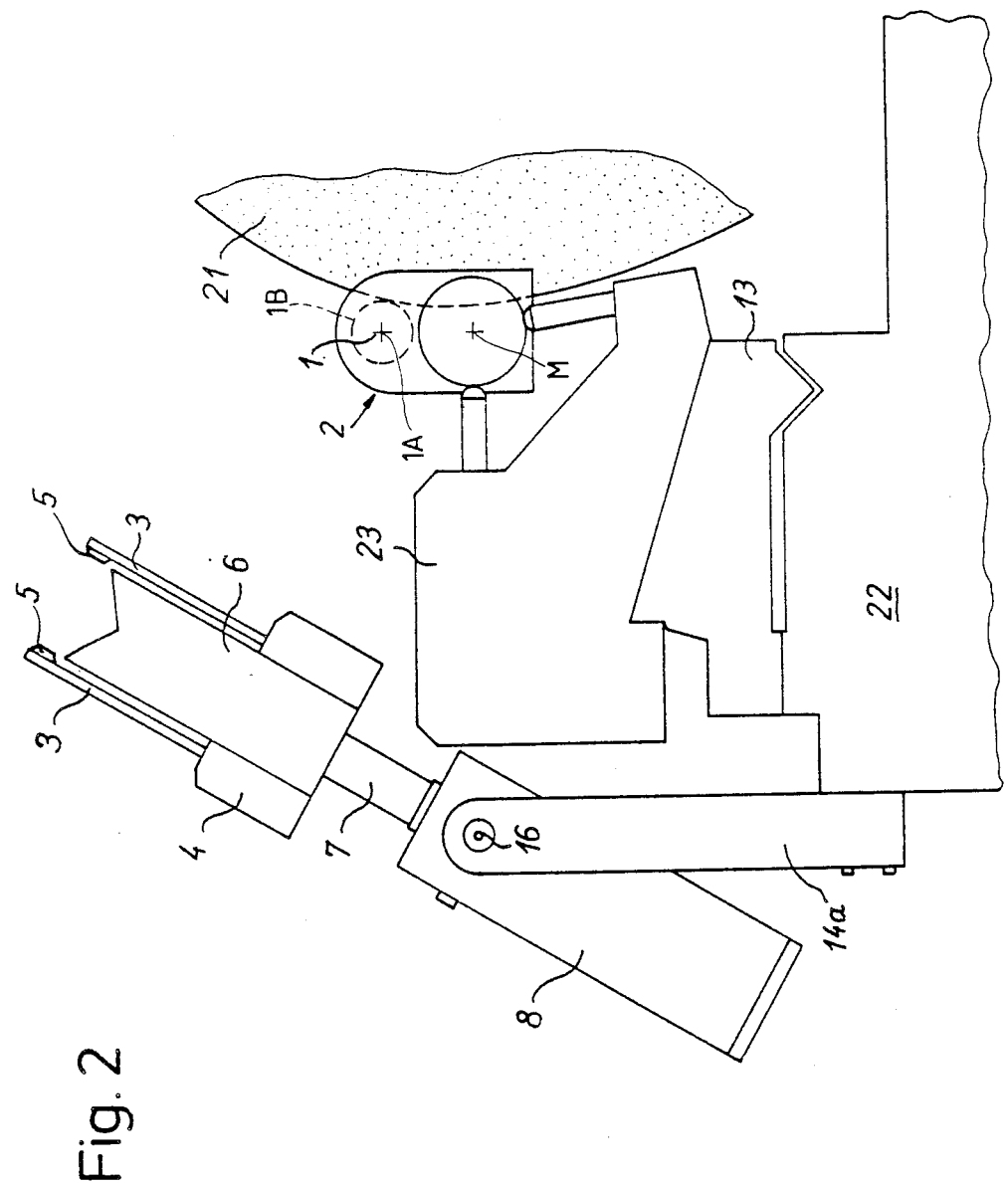
FIG. 2 is a schematic elevational view of a modified monitoring apparatus whose carrier means is affixed to the understructure of the frame of a grinding machine and wherein the guide is pivoted out of the way so as to allow for replacement of a finished crankshaft or for shifting of the crankshaft to a position in which an untreated crankpin is located at the material removing station.

The apparatus of FIG. 1, wherein the holder 14 is fixedly secured to the table 13 of the grinding machine, can be used with particular advantage for the treatment of a long series of crankshafts 2 so that it pays to provide a discrete apparatus for each crankpin 1 of the crankshaft which is mounted for rotation about the axis M. FIG. 2 shows a somewhat modified apparatus whose versatility is enhanced in that the holder 14a for the cylinder 8 is removably secured to the understructure 22 of the frame of the grinding machine including the grinding wheel 21 and means for supporting a crankshaft 2 for rotation about the axis M which is parallel to the axis 1A of the illustrated crankpin 1. The mounting of the holder 14a on the understructure 22 is such that the cylinder 8 can be pivoted to a position (shown in FIG. 2) in which it permits one or more superstructures 23 (e.g., one or more steady rests or follow rests for the crankshaft 2) to bypass the guide 6 and the parts 4, 3 thereon. This enables the supporting means for the crankshaft 2 to move any one of two or more crankpins 1 to an optimum position with reference to the grinding wheel 21. The holder 14a and the parts which are supported thereby are mounted directly opposite the material removing station so that the guide 6 and the edges 5 of the sensors 3 can be moved into requisite contact with the peripheral surface 1B of the crankpin 1 which is then located at the material removing station. The manner in which a supporting device can shift a crankshaft axially so as to place a selected crankpin into register with the grinding wheel is known and is not specifically shown in the drawing. The manner in which the cylinder 8 is mounted on the pin 16 for pivotal movement about an axis which is parallel to the axis M is preferably the same as described in connection with FIG. 1. The same applies for the arresting means (not shown) which can hold the cylinder 8 of FIG. 2 in at least one selected angular position and for the means (not shown) for retracting the piston rod 7 and the guide 6 against the opposition of resilient means in the interior of the cylinder.

The superstructure 23 is reciprocable along the table 13 in parallelism with the axes M and 1A.

Figure 3:
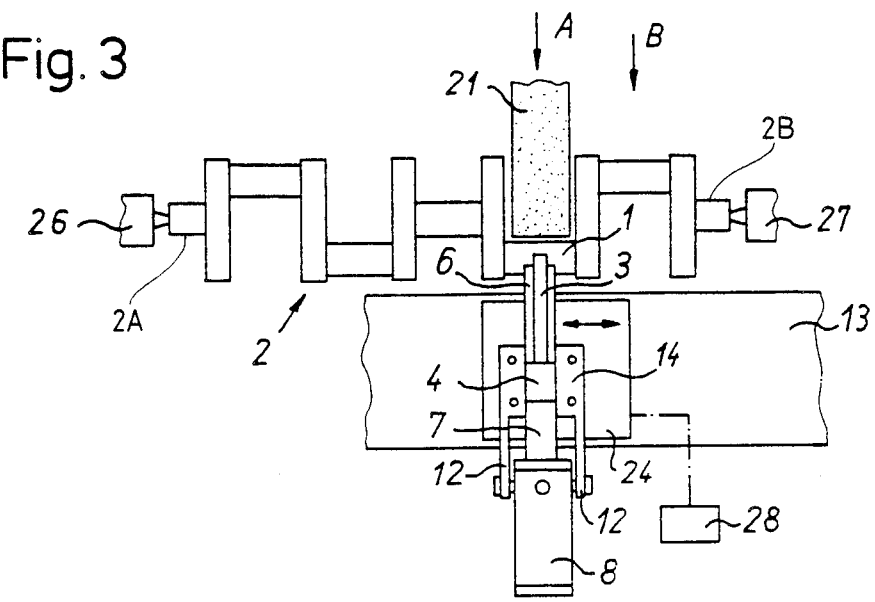
FIG. 3 is a plan view of a third apparatus whose carrier means for the guide is reciprocable with a carriage in parallelism with the axis of the grinding wheel and with the main axis of the crankshaft.

FIG. 3 shows the supporting means for a crankshaft 2. The illustrated supporting means includes a headstock 26 for the end portion 2A and a tailstock 27 for the end portion 2B of the crankshaft 2. The illustrated crankshaft 2 has four crankpins 1 one of which is located at the material removing station A accommodating the grinding wheel 21. The holder 14 of the apparatus which is shown in FIG. 3 is mounted on a carriage 24 which is reciprocable along ways (not specifically shown) provided therefor in or on the table 13 of the grinding machine. Thus, if the treatment of the referenced crankpin 1 is completed, the carriage 24 can be shifted in a direction to the right, as viewed in FIG. 3, so as to move the guide 6 and the parts 3, 4 thereon from the material removing station A to the material removing station B. Alternatively, the carriage 24 can move the apparatus of FIG. 3 to the left so that the guide 6 can come into contact with the peripheral surface of the leftmost or next-to-the-leftmost crankpin 1 of the crankshaft 2 which is shown in FIG. 3. The drive means for reciprocating the carriage 24 relative to the machine table 13 is shown schematically at 28. Such drive means can constitute a hydraulic, pneumatic or electric driving unit. For example, the drive means 28 can comprise a reversible electric motor which drives a rotary feed screw meshing with a nut of the carriage 24.

The manner in which the grinding wheel 21 can be moved from the station A to the station B or to another material removing station is not shown in FIG. 3. To this end, the spindle for the grinding wheel 21 can be mounted on a further carriage which is movable in parallelism with the axes of the crankpins 1.

Figure 4:
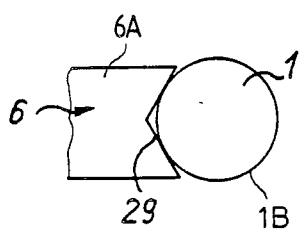
FIG. 4 is a fragmentary elevational view of that portion of the guide which is movable into contact with the periphery of an object and whose object-contacting surface has a V-shaped outline.

FIG. 4 shows the front portion 6A of a guide 6 of the type used in the monitoring apparatus of FIGS. 1, 2 and 3. This front portion resembles a prism with a V-shaped object-contacting surface 29 consisting of two mirror symmetrical halves which make an oblique angle or a right angle and each of which is in linear contact with the peripheral surface 1B of the selected crankpin 1.

Figure 5:
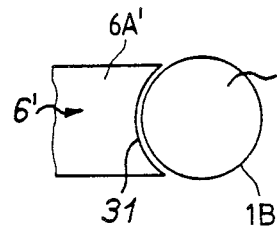
FIG. 5 is a similar view of a modified guide which has a concave object-contacting surface.

FIG. 5 shows the front portion 6A' of a modified guide 6' which is provided with a concave object-contacting surface 31. When the apparatus employing the guide 6' of FIG. 5 is in actual use, the concave surface 31 is in a single-line contact with the peripheral surface 1B of the selected crankpin 1.

Figure 6:
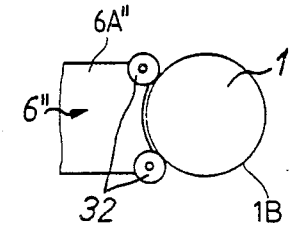
FIG. 6 is a similar view of a guide which carries two rotary object-contacting followers.

FIG. 6 shows the front portion 6A'' of a third guide 6'' which carries two roller followers 32 each of which can be moved into linear contact with the peripheral surface 1B of the selected crankpin 1. Each of the roller followers 32 can consist of a row of two or more shorter rollers or each such roller can be replaced with one or more spheres each of which is in a mere point contact with the peripheral surface 1B of the adjacent crankpin 1.

Figure 7:
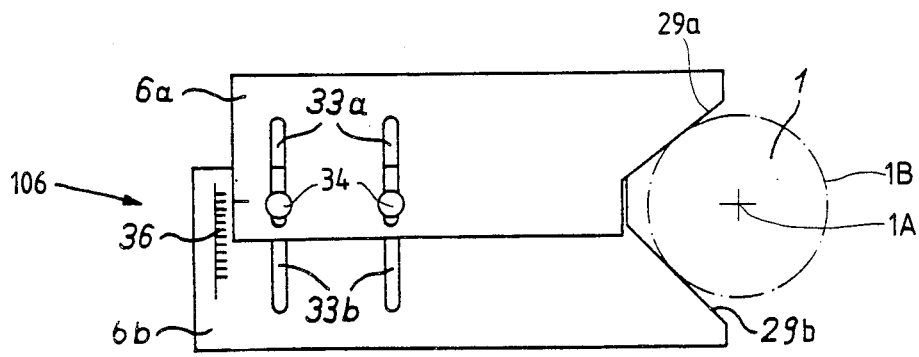
FIG. 7 is an elevational view of a further guide which is adjustable so that it can be used to properly engage large-diameter, medium-diameter or small-diameter objects.

The versatility of the improved apparatus can be enhanced still further if the guide 6, 6' or 6'' is replaced with an adjustable guide 106 of the type shown in FIG. 7 or an analogous adjustable guide. The guide 106 comprises two substantially mirror symmetrical sections 6a and 6b at least one of which is movable with reference to the piston rod 7 (not shown in FIG. 7) relative to the other section so as to vary the distance between the surfaces 29a, 29b at the front ends of such sections and to thus enable the guide 106 to adequately contact large-diameter, medium-diamater or small-diameter cylindrical or analogous objects, e.g., objects in the form of crankpins 1.

The section 6a is formed with two parallel openings 33a in the form of elongated closed slots which extend transversely of the axis 1A of the illustrated crankpin 1 (and hence at right angles to the axis M of the respective crankshaft) and partially overlap similar openings (elongated closed slots) 33b of the section 6b. Fastener means 34 in the form of bolts and nuts or the like are provided to releasably secure the sections 6a and 6b to each other in selected positions for optimum engagement of their surfaces 29a, 29b with the peripheral surface 1B of a selected crankpin 1. The shanks of the bolts of the fastener means 34 extend through the respective pairs of openings 33a, 33b. The section 6b carries a suitably graduated scale 36 to facilitate the adjustment of the sections 6a, 6b relative to each other.

The adjustable guide 106 of FIG. 7 can be replaced with other types of adjustable guides, e.g., with a guide whose sections are pivotable relative to each other. Also, the sections 6a, 6b can be provided with suitable guide elements (not shown) which ensure that the sections 6a or 6b can be shifted only at right angles to the axis 1A of the crankpin 1, i.e., that the orientation of the two sections remains unchanged irrespective of the selected distance between the object-contacting surfaces 29a and 29b.

The illustrated monitoring apparatus can be used with equal or similar advantage in other types of machine tools, e.g., in a milling machine wherein the material removing means comprises one or more milling cutters. Moreover, the apparatus can be used with advantage for monitoring the diameters of crankpins or any other objects which are caused to circulate or orbit about a predetermined axis during removal of material from their peripheral surfaces. In addition, the apparatus can be used to ascertain the diameters of circulating cylindrical or barrel-shaped objects whose diameters vary as a result of wear or as a result of deposition of material thereon.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for monitoring the diameters of round objects, particularly of substantially cylindrical workpieces during their treatment in a machine tool such as a grinding machine, comprising supporting means defining a predetermined axis and arranged to mount objects in positions such that the axis of the object which is mounted in said supporting means is parallel to said predetermined axis and the object is free to circulate about the predetermined axis along a predetermined path; a guide having an object-contacting portion; at least one sensor provided on said guide and arranged to track the periphery of an object which circulates along said path while said portion of said guide contacts the periphery of the circulating object; detector means provided on said guide and arranged to monitor the position of said sensor; and carrier means for said guide, said guide being mounted on said carrier means for movement substantially radially of said path and said carrier means defining for said guide a pivot axis which is at least substantially parallel to said predetermined axis.

2. The apparatus of claim 1, further comprising means for biasing said portion of said guide against the periphery of the object which circulates along said path.

3. The apparatus of claim 2, wherein said carrier means comprises a holder, a cylinder mounted in said holder for movement about said pivot axis, a piston reciprocably mounted in said cylinder and a piston rod connecting said piston to said guide.

4. The apparatus of claim 3, wherein said biasing means comprises resilient means installed in said cylinder and bearing against said piston to urge the latter in a direction such that the piston rod maintains said portion of the guide in contact with the periphery of the object circulating along said path.

5. The apparatus of claim 3, further comprising means for moving said guide away from contact with the periphery of the object which circulates along said path.

6. The apparatus of claim 5, wherein said moving means includes a source of pressurized fluid and means for admitting pressurized fluid from said source into said cylinder so as to move said piston against the opposition of said biasing means.

7. The apparatus of claim 1, wherein said portion of said guide has a substantially V-shaped object-contacting surface.

8. The apparatus of claim 1, wherein said portion of said guide has a substantially concave object-contacting surface.

9. The apparatus of claim 1, wherein said portion of said guide has at least one rotary object-contacting follower.

10. The apparatus of claim 9, wherein said portion of said guide has several followers and each of said followers is rotatable about an axis which is at least substantially parallel to said predetermined axis.

11. The apparatus of claim 1, wherein said portion of said guide is adjustable so as to be movable into contact with objects having widely different diameters.

12. The apparatus of claim 11, wherein said portion of said guide comprises two sections at least one of which is adjustable relative to the other of said sections.

13. The apparatus of claim 12, wherein each of said sections has an object-contacting surface and such surfaces are inclined with reference to each other.

14. The apparatus of claim 12, wherein at least one of said sections has an elongated opening extending transversely of said predetermined axis and further comprising fastener means including a portion extending through said opening and arranged to releasably secure said sections to each other.

15. The apparatus of claim 14, wherein each of said sections has a plurality of elongated openings and each opening of one of said sections overlies a discrete opening of the other of said sections, said fastener means including a discrete fastener for each pair of overlapping openings.

16. The apparatus of claim 12, wherein at least one of said sections is provided with a graduated scale to facilitate selection of the position of said adjustable section with reference to the other section.

17. The apparatus of claim 1 for use in a machine having a frame, wherein said carrier means is mounted in or on such frame.

18. The apparatus of claim 17, wherein said carrier means includes a holder which is affixed to the frame of the machine, said guide being reciprocable and pivotable with reference to said holder.

19. The apparatus of claim 17, wherein said carrier means comprises a holder which is supported by said frame, a cylinder mounted in said holder for movement about said pivot axis, a piston reciprocably mounted in said cylinder and a piston rod connecting said piston with said guide, at least a portion of said cylinder being disposed at one side of said pivot axis and said guide and said detector means being disposed at the other side of said pivot axis, the mass of said portion of said cylinder constituting a counterweight for said detector means and said guide so that said cylinder is turnable about said pivot axis with the exertion of a minimal force.

20. The apparatus of claim 19, wherein said pivot axis is at least substantially horizontal.

21. The apparatus of claim 17, further comprising means for releasably fixing said guide in a predetermined position with reference to said pivot axis.

22. The apparatus of claim 21, wherein said fixing means comprises a pin-shaped member which is movable relative to said carrier means between a first position in which said guide is free to turn about said pivot axis and a second position in which the guide is held in said predetermined position.

23. The apparatus of claim 17, wherein said carrier means includes a holder which is fixedly secured to the frame of the machine.

24. The apparatus of claim 17, wherein the frame of the machine comprises a table and said holder is affixed to such table.

25. The apparatus of claim 17, wherein the frame of the machine comprises an understructure and said carrier means comprises a holder which is affixed to such understructure.

26. The apparatus of claim 17, wherein said carrier means comprises a carriage which is reciprocable with reference to the frame of the machine.

27. The apparatus of claim 1, wherein said sensor includes an object-contacting portion which is movable with reference to said guide so as to remain in contact with the periphery of an object which orbits along said path and whose diameter is in the process of decreasing as a result of engagement with a material removing tool.

* * * * *